(12) United States Patent
Schafer (10) Patent No.: US 6,300,875 B1
(45) Date of Patent: Oct. 9, 2001

(54) METHOD AND APPARATUS FOR HIGH EFFICIENCY POSITION INFORMATION REPORTING

(75) Inventor: Robert W. Schafer, Parker, TX (US)

(73) Assignee: MCI WorldCom, Inc., Jackson, MS (US)

(*) Notice: Subject to any disclaimer, the term of this patent is extended or adjusted under 35 U.S.C. 154(b) by 0 days.

(21) Appl. No.: 09/444,859

(22) Filed: Nov. 22, 1999

(51) Int. Cl.[7] .................................................. G08B 23/00
(52) U.S. Cl. ................................. 340/573.1; 340/573.4; 340/539
(58) Field of Search ..................... 340/540, 539, 340/573.1, 573.4, 991, 825.36, 825.49, 572.1; 342/457, 465, 456

(56) References Cited

U.S. PATENT DOCUMENTS

| 5,365,516 | * | 11/1994 | Jandrell | 340/991 |
| 5,396,429 | * | 3/1995 | Hanchett | 340/910 |
| 5,650,770 | * | 7/1997 | Schlager et al. | 340/573.1 |
| 5,742,233 | * | 4/1998 | Hoffman et al. | 340/573.1 |
| 5,825,283 | * | 10/1998 | Camhi | 340/438 |
| 5,835,907 | | 11/1998 | Newman | 707/10 |
| 5,844,522 | | 12/1998 | Sheffer et al. | 342/457 |
| 5,892,454 | * | 4/1999 | Schipper et al. | 340/573.4 |
| 5,918,180 | | 6/1999 | Dimino | 455/455 |
| 5,963,130 | * | 10/1999 | Schlager et al. | 340/540 |
| 6,072,396 | * | 6/2000 | Gaukel | 340/573.4 |

* cited by examiner

Primary Examiner—Van T. Trieu

(57) ABSTRACT

A system for communicating the location of an object, the system including a transmitter, the transmitter being capable of communicating using any one of a plurality of possible non-switched communications networks; a GPS receiver coupled to the transmitter, the GPS receiver being configured to providing data representing position of the GPS receiver, such that the data generated by the GPS receiver can be transmitted by the transmitter; a common housing supporting the transmitter and the GPS receiver to define a portable package; and a monitoring device remote from the portable package, the transmitter being configured to transmit communications to the monitoring device via a non-switched wireless network without need for human intervention in initiating a call from either the transponder or the monitoring device.

30 Claims, 4 Drawing Sheets

METHOD AND APPARATUS FOR HIGH EFFICIENCY POSITION INFORMATION REPORTING

TECHNICAL FIELD

The invention relates to systems for tracking and locating the position of a person, animal, or object. The invention also relates to global positioning systems and to communications systems.

BACKGROUND OF THE INVENTION

A technology solution that has been applied for thwarting car thefts involves a transmitter coupled to a location-determining device, such as one utilizing the Global Positioning System (GPS). Upon theft of a vehicle, the transmitter automatically broadcasts the stolen vehicle location without knowledge of anyone in the vehicle. Vehicles are often recovered intact and the thieves are often caught as well.

See, for example, U.S. Pat. No. 5,918,180 to Dimino (incorporated herein by reference). Dimino discloses a tracking system for monitoring and locating vehicles that includes a cellular telephone that is located in the vehicle, a global positioning system receiver also located within the vehicle, and an interface unit between the global positioning receiver and the telephone. The global positioning receiver communicates with a system of satellites and provides continuous data reflecting the present spatial location of the vehicle in terms of its latitude and longitude coordinates. The interface between the GPS receiver, and the wireless telephone includes a speech synthesizer circuit that converts the digitally encoded spatial coordinates into speech, so that position is enunciated through the cellular phone. Note, however, that the owner of the vehicle must call the vehicle cellular telephone to obtain the position information.

More recently, a similar technique has been proposed for preventing child abductions. The main challenge has been development of a small, lightweight and inexpensive portable package that consumes little power. Only in recent years have small, moderately priced GPS devices become commercially available. One proposed system, sold under the trademark SatCell, includes a GPS receiver and a cellular telephone combined together in a single lightweight portable package. This package can report its location, heading and speed every 15 seconds, but only during an established cellular telephone connection. This allows a parent/guardian or other tracking entity (e.g., a security service) to monitor the position of a child bearing the portable package from a remote computer screen or other tracking unit. The location information is transmitted periodically during the cellular telephone call because it would be difficult to otherwise detect an abduction event and trigger the package to transmit only when there is an emergency.

Although such a system is readily implementable, there are many shortcomings, including availability, scalability, geographic coverage, and power consumption. Even with new battery technology, cellular phones consume power much more rapidly when in a transmit/receive mode as opposed to while in the stand-by mode. Further, a cellular call must be initiated before communication can take place. A captor or hijacker may move a person for an amount of time longer than during which the cell phone battery could last while in the transmit/receive mode. Note that it is known to determine a PCS subscriber's location using GPS. See, for example, U.S. Pat. No. 5,835,907 to Newman, assigned to the assignee of the present invention, and incorporated herein by reference. U.S. Pat. No. 5,835,907 discloses a wireless communication device, operating over frequencies allocated to Personal Communications Services (PCS), which uses GPS technology to determine the subscriber's exact location on a periodic basis. The device sends the location information to a database for storage and subsequent retrieval by a Geographical Information System (GIS) software application. The GIS converts the location information represented by a latitude/longitude combination to a user-friendly classification of a block, street, city, etc. The user-friendly classification of the subscriber's location is then automatically communicated to emergency services and/or a designated contact, if an emergency button has been activated on the device. Alternatively, the device responds to on-demand inquiries on the subscriber's location via a computer link or a computerized voice processing equipment, such as a Voice Response Unit (VRU). Such a system automatically transmits over a unidirectional link, location information and a unique code which identifies the PCS device to a computer network over a wireless medium, and selectively generates a distress signal responsive to activation by the user of the PCS device. This system is designed for overt use in an emergency, not for covert use in an abduction or runaway situation.

SUMMARY OF THE INVENTION

The invention provides a method and apparatus for determining and communicating the location of an object or person. A GPS receiver is configured to provide data representing position of the receiver in terms of latitude and longitude. The GPS receiver is coupled to the transponder such that the data generated by the GPS receiver can be transmitted by the transponder. A common housing is provided, supporting the transponder and the GPS receiver to define a portable package. The data is transmitted, from the portable package, to a monitoring device remote from the portable package. The transponder of the portable package is configured to transmit communications to the monitoring device via a non-switched wireless network without need for human intervention in initiating a call from either the transponder or the monitoring device.

In one aspect of the invention, the transponder is capable of communicating using any of a plurality of communications networks, such as a PCS network, an MMDS network, or an APRS network. In one aspect of the invention, the method further comprises selecting a network for communication from the transponder based on signal availability. In another aspect of the invention, the method further comprises selecting a network, for communication from the transponder, based on signal strength.

In another aspect of the invention, an alarm signal is provided when specified position parameters are exceeded relative to the portable package. For example, an alarm signal is provided if the portable package has been moved more than a predetermined distance from predefined acceptable coordinates. The alarm signal initiates a communication transmission to the monitoring device indicating that an alarm condition exists. Alternatively, or in addition, an alarm signal is provided if the portable package moves at a speed greater than a predetermined speed, the speed being determined based on information supplied by the GPS receiver. The alarm signal initiates a communication transmission to the monitoring device indicating that an alarm condition exists.

In another aspect of the invention, the portable package position information, as determined by the GPS receiver, is stored at a plurality of time intervals.

In another aspect of the invention, Personal Communication Service (PCS) networks and frequencies in accordance with Part 24 of the FCC rules are used. Position determination devices use the GPS to identify location, bearing, and speed of travel. This and other related information is transmitted over these frequencies, where PCS networks relay transmissions to designated locations, including Internet destinations via gateways. This avoids tying up expensive, higher bandwidth cellular telephone channels and equipment to handle the continuous and relatively low-bandwidth demands of position reporting. This also makes broad geographic coverage more cost effective, as the PCS service providers have extensive coverage areas.

In another aspect of the invention Amateur Radio Service (FCC Part 97) packet networks with frequencies utilized for Automatic Position Reporting System (APRS) traffic today are used. In accordance with this aspect of the invention, GPS is used to identify location, bearing, and speed of travel. This and other related information is transmitted over APRS frequencies, where distributed APRS "digipeaters" relay transmissions to designated locations, including Internet destinations via gateways. This avoids tying up expensive, higher bandwidth cellular telephone channels and equipment to handle the continuous and relatively low-bandwidth demands of position reporting. Using the APRS allows continuous interaction between the portable package and the tracking entity without the need for a wireless telephone call to establish two-way communications. This also makes broad geographic coverage more cost effective.

In another aspect of the invention, security measures are employed that prevent would-be abductors from locating potential victims using the system. A code is entered into both the portable package and the tracking entity. The code serves as a key for decrypting positional data that is encrypted by the portable package. If Amateur Radio Service frequencies are used, a waiver will be required for the FCC rule prohibiting encrypted signals.

In another aspect of the invention, the portable package receives and monitors GPS information but does not routinely report its position. A set of portable package parameters determines when it declares an alarm state and begins continuous transmission of position information. This practice is advantageous for improved scaling and for drawing attention to alarm-only signals. Adjustable parameters are, in one embodiment, maximum distance from a given location or a maximum speed threshold. For example, if a child is supposed to be walking to school, the portable package should go into alarm if the speed of travel jumps to 30 mph. A child's location range may be specified such that the child can be some distance away from a given point (e.g., the parent), yet still be tightly constrained. For example, a child must be at a given soccer field +/-200 yards, while the parent may be miles away. A variation upon this may be applied where the child is supposed to remain close to a parent, which is often the case. In this embodiment, the parent or guardian carries a tracking unit that sends a keep alive signal that the portable package monitors, and, in one embodiment, even responds to. Loss of signal either way triggers the parent's local alarm and also triggers position reporting and tracking signals from the portable package.

In another aspect of the present invention, the portable package, the monitoring unit, and/or the receiver/repeater keep a historical record of reported locations that can be used to reconstruct a path. This can aid in apprehension/recovery even if the portable package becomes separated from the person using it.

In another aspect of the invention, multiple modes of transmission are supported and may be employed dynamically as the portable package detects the local availability of receiving nodes. In this manner, signal robustness is improved and the coverage area is effectively broadened. For example, the location of the portable package may be outside the coverage area of a PCS network node, but within the coverage area of a Multichannel Multipoint Distribution Services (MMDS) network node. A polling arrangement constantly evaluates available network nodes to provide the best possible scenario supporting continuous tracking.

DETAILED DESCRIPTION OF THE PREFERRED EMBODIMENTS

Figure 1:
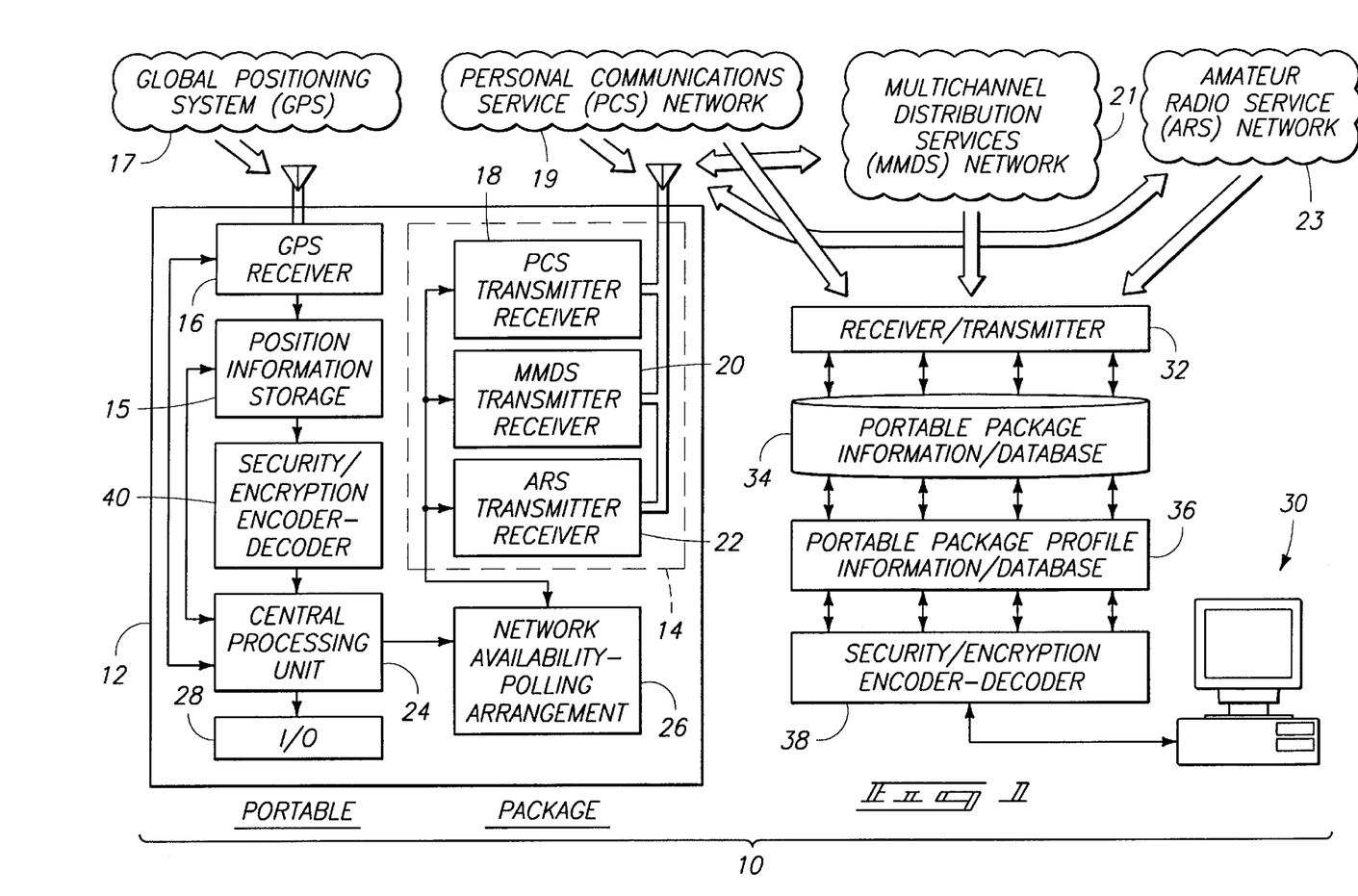
FIG. 1 is a block diagram of a system for determining and communicating location information in accordance with one embodiment of the invention.

FIG. 1 shows a system 10 for communicating the location of an object. The system 10 comprises a portable package 12 including a transmitter. In the illustrated embodiment, the portable package 12 includes a transponder 14, capable of receiving as well as transmitting. In an alternative embodiment, the capability to receive is omitted. The system 10 further includes a GPS receiver 16 coupled to the transponder 14. The GPS receiver 16 receives data from satellites of a global positioning system 17 and provides data 10 representing position of the GPS receiver 16, in terms of latitude and longitude. Because the GPS receiver 16 is coupled to the transponder 14, the transponder 14 can transmit the data generated by the GPS receiver.

In one embodiment, the portable package 12 further includes position information storage 15, such as a memory, periodically storing the position information generated by the GPS receiver 16.

The transponder 14 is capable of communicating using any one of a plurality of communications networks. By non-switched, what is meant is that a call does not need to be initiated and answered before a transmission can start. For example, the transponder 14 is capable of selecting then transmitting using a PCS network 19 (e.g., the paging service or feature of a PCS network), an MMDS network 21, an APRS network 23 in the illustrated embodiment. Alternative or additional appropriate networks could be employed, but PCS, MMDS, and APRS will be discussed in connection with FIG. 1, by way of example only.

PCS pagers and phones are well known in the art and any appropriate PCS transmitter and receiver can be incorporated into the transponder 14 as PCS transmitter/receiver circuitry 18.

MMDS stands for Multipoint Multipoint Distribution Service. MMDS is similar to conventional television transmission (thus, is non-switched in the sense that a call doesn't need to be initiated and answered) but operates at microwave frequencies. Loma Scientific, of Torrance, Calif., sells a model L245 Series 100 milliwatt single channel, agile MMDS transmitter that is portable and it or a similar product can be incorporated into MMDS transmitter/receiver circuitry 20 of the transponder 14.

Automatic Position Reporting System (APRS) uses digital amateur radio. When the transponder uses APRS, Amateur Radio Service (FCC Part 97) packet networks with frequencies utilized for APRS traffic, e.g., 144.39 MHz are used. A Kenwood TH-D7A radio will communicate at this frequency and it or a similar product can be incorporated into the transponder 14 as APRS transmitter/receiver circuitry 22. APRS transmits users' position information to everyone else and displays the information on a map. APRS software is software that takes advantage of the availability of inexpensive GPS receivers to display the locations of moving GPS stations on a personal computer in which the APRS software is installed. By connecting a personal computer to a radio network via an inexpensive radio data modem, all stations can see the movements of all other stations. APRS permits any number of stations to exchange data just like voice users but without the complexity of maintaining separate point-to-point links. The APRS software and information about APRS can be readily located by searching for the term APRS in any major Internet search engine (e.g., Lycos, Yahoo, Alta Vista, etc.). For example, the APRS software can be downloaded from the Internet from Rutgers University's web site (presently ftp://aprs.rutgers.edu) and from Tucson Amateur Packet Radio's web site (presently http://www.tapr.org or ftp://www.tapr.org/aprssig).

The GPS receiver 16 is used to identify location, bearing, and speed of travel. This and other related information is transmitted using a selected communication network using a selected one of many possible communications networks. PCS transmitter/receiver circuitry 18, MMDS transmitter/receiver circuitry 20, and APRS transmitter/receiver circuitry 22 using APRS frequencies are the alternatives in the illustrated embodiment; however, other alternatives can be employed.

Figure 2:
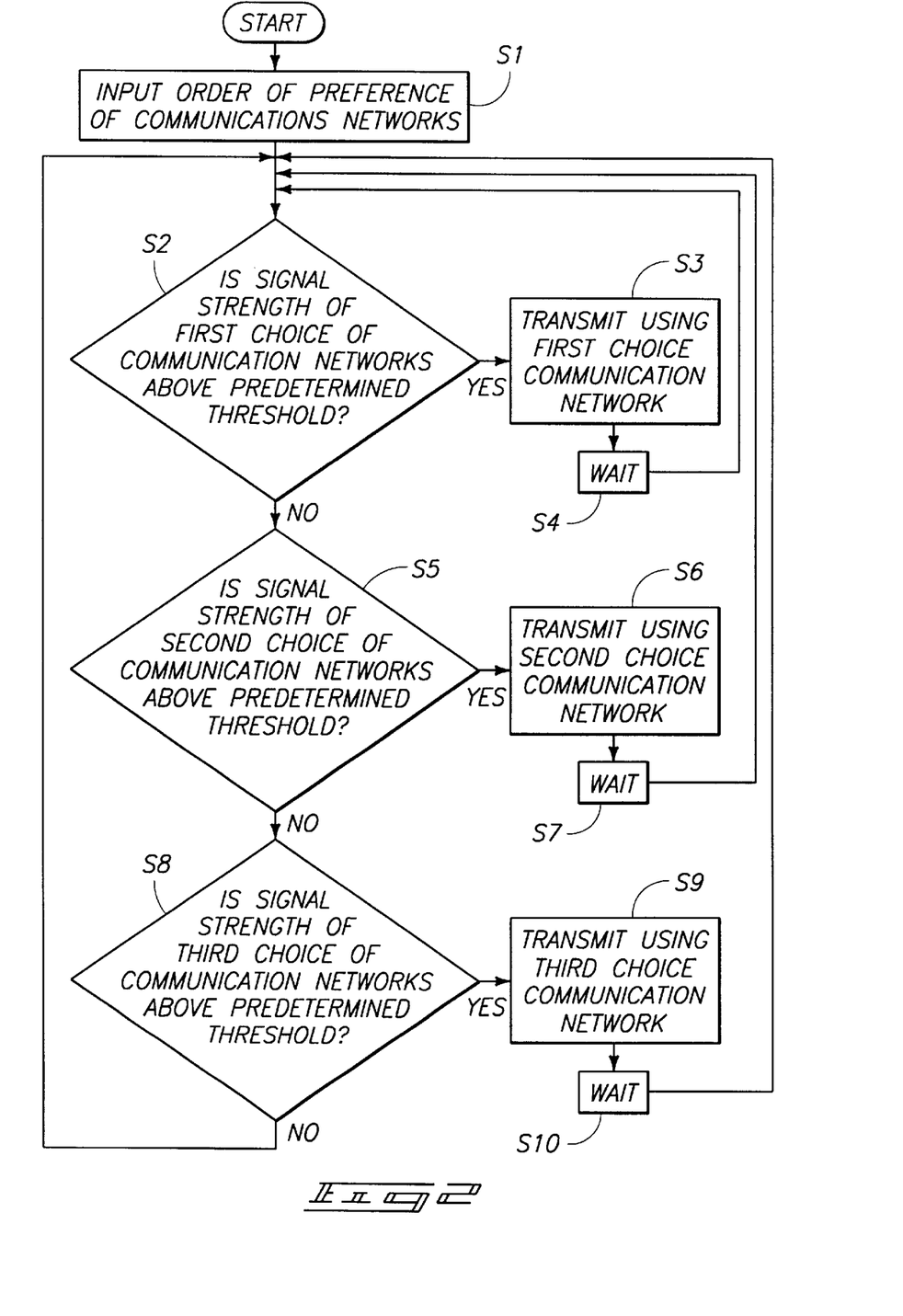
FIG. 2 is a flowchart illustrating logic executed by the system of FIG. 1.

The portable package 12 includes a central processing unit (CPU) 24 which selects a communications mode by selecting transmitter/receiver circuitry 18, 20, or 22 using network availability polling circuitry or software 26. A communications mode is selected based on signal availability. Operation of the polling circuitry or software 26 is illustrated in FIG. 2.

In a first step S1, the order of preference of communications networks 18, 20, and 22 is input or pre-programmed into the portable package 12. In one embodiment, the user is allowed to program the order, e.g., using a keyboard or other input/output facility 28. This is an initial setup operation. After performing step S1, the CPU proceeds to step S2.

In step S2, a determination is made as to whether the signal strength for the first choice of communication networks (e.g., PCS) is above a predetermined threshold. This determination is made, for example, by either actually determining signal strength or by predicting signal strength based on stored coverage areas and present position, as determined using the GPS receiver. If the signal strength for the first choice of communication networks is above a predetermined threshold, the CPU proceeds to step S3. If not, the CPU proceeds to step S5.

In step S3, GPS data is transmitted using the first choice of communications networks (e.g., PCS using transmitter/receiver circuitry 18). After performing step S3, the CPU proceeds to step S4.

In step S4, the CPU waits, in one embodiment, for a predetermined amount of time. For example, in this embodiment, communications take place periodically. In an alternative embodiment, which will be described below, communications are continuous after an alarm condition is met. After performing step S4, the CPU proceeds to step S2.

In step S5, a determination is made as to whether the signal strength for the second choice of communication networks (e.g., MMDS) is above a predetermined threshold. If the signal strength for the second choice of communication networks is above a predetermined threshold, the CPU proceeds to step S6. If not, the CPU proceeds to step S8.

In step S6, GPS data is transmitted using the second choice of communications networks (e.g., MMDS using transmitter/receiver circuitry 20). After performing step S6, the CPU proceeds to step S7.

In step S7, the CPU waits, in one embodiment, for a predetermined amount of time. After performing step S7, the CPU proceeds to step S2.

In step S8, a determination is-made as to whether the signal strength for the third choice of communication networks (e.g., APRS) is above a predetermined threshold. If the signal strength for the third choice of communication networks is above a predetermined threshold, the CPU proceeds to step S9. If not, the CPU proceeds to step S2.

In step S9, GPS data is transmitted using the third choice of communications networks (e.g., APRS using transmitter/receiver circuitry 22). After performing step S9, the CPU proceeds to step S10.

In step S10, the CPU waits, in one embodiment, for a predetermined amount of time. After performing step S10, the CPU proceeds to step S2.

If there are additional communication networks that could be used and corresponding transmitter/receiver circuitry in the transponder 14, steps similar to steps S2, S3, and S4 could be added for that communication network. Thus, although FIGS. 1 and 2 illustrate three alternative communication networks, there may be additional communication networks that can be selected.

The system 10 further includes a monitoring device 30 remote from the portable package 12. The transponder 14 is configured to transmit communications to the monitoring device 30 via a nonswitched wireless network (e.g. PCS, MMDS, or APRS) without need for human intervention in initiating a call from either the transponder 14 or the monitoring device 30. The monitoring device 30 includes a transponder 32 including receiver/transmitter circuitry for communication with the various transmitter/receiver circuits 18, 20, and 22 of the portable package 12 and any other portable packages that may be monitored. More particularly, the monitoring device 30 may be manned by a monitoring service, such as one currently used to monitor home or business alarm systems, and may monitor multiple portable packages 12. The monitoring device 30 further includes a portable package information database 34. This database includes account information for owners of portable packages 12 monitored by this particular monitoring service. The monitoring device 30 further includes a portable package profile information interface/database 36. This database 36 is used to set up parameters to define alarm situations for respective portable packages 12 that are being monitored, in one aspect of the invention, as shown in FIG. 3.

More particularly, in the illustrated embodiment, either the CPU 24 or a CPU in the monitoring device 30, or both generate an alarm signal if an alarm condition arises. The alarm signal is generated by the portable package 12 and transmitted to the monitoring device 30 in one embodiment. In another embodiment, only position information is transmitted by the portable package 12 and the monitoring device 30 determines whether an alarm condition exists based on this information and parameters stored in the database 36.

Figure 3:
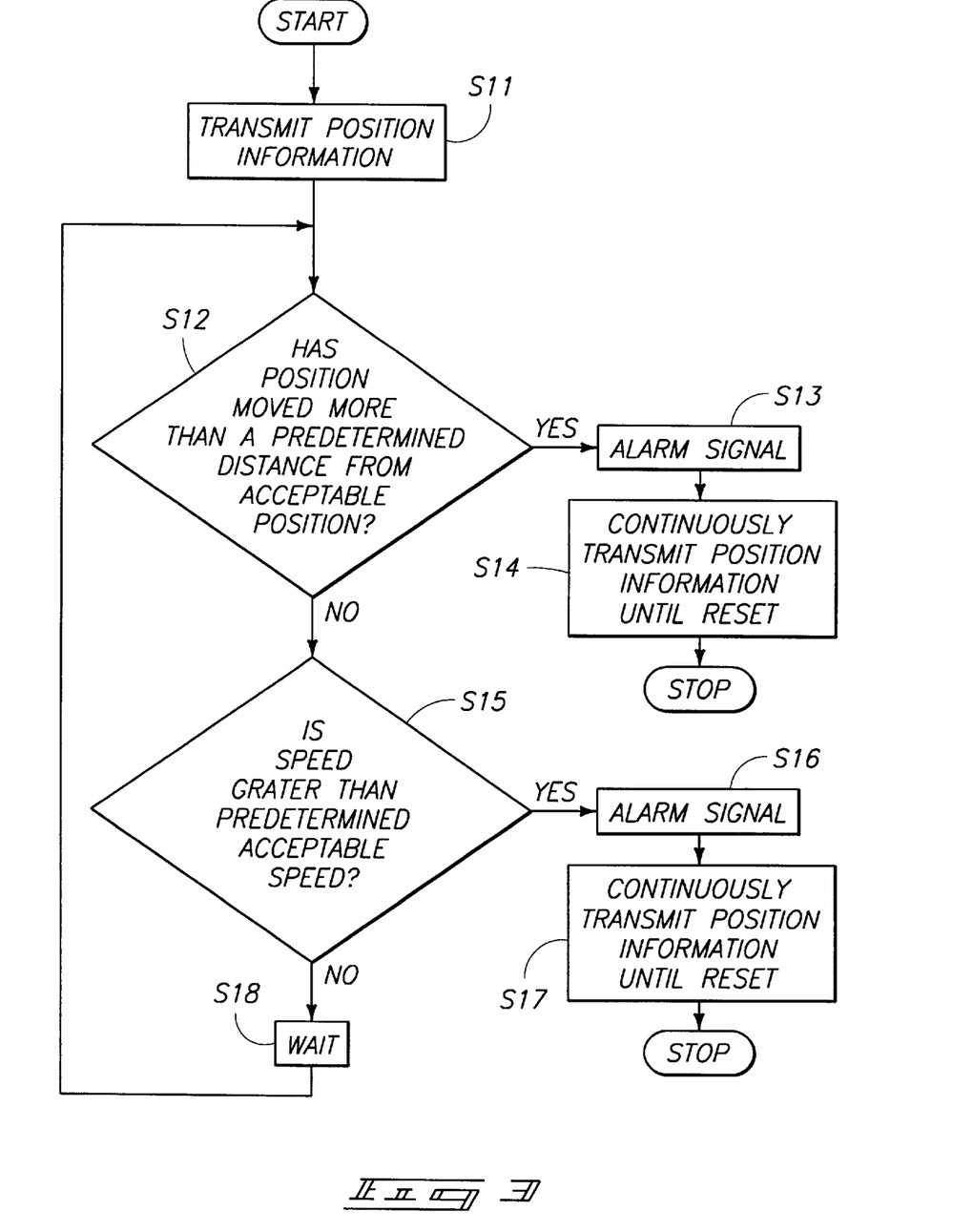
FIG. 3 is a flowchart illustrating logic executed by the system of FIG. 1 in accordance with one alternative embodiment.

FIG. 3 illustrates logic performed by the portable package 12 in one embodiment.

In step S11, the portable package 12 transmits position information. After performing step S11, the CPU proceeds to step S12.

In step S12, a determination is made as to whether the portable package has moved more than a predetermined distance from an acceptable position. This is done by comparing position of the portable package, based on information supplied by the GPS receiver, with a predefined acceptable position stored in either the monitoring device 30 or the portable package 12 (the latter would require two-way communications, which would in turn require that the transponder 14 include receivers). If so, the CPU proceeds to step S13. If not, the CPU proceeds to step S15.

In step S13, an alarm signal is generated. If the alarm is generated at the portable package 12, the transponder 14 transmits a communication to the monitoring device 30 indicating that an alarm condition exists. After performing step S13, the CPU proceeds to step S14.

In step S14, in one embodiment, the portable package 12 continuously transmits position information until it is reset, e.g. by entering a code using the I/O port 28.

In step S15, a determination is made as to whether speed of the portable package 12 is greater than a predetermined acceptable speed. This is done by determining change in position of the portable package, based on information supplied by the GPS receiver, relative to time, and comparing determined speed with a predefined acceptable speed stored in either the monitoring device 30 or the portable package 12.

In step S16, an alarm signal is generated. If the alarm is generated at the portable package 12, the transponder 14 transmits a communication to the monitoring device 30 indicating that an alarm condition exists. After performing step S16, the CPU proceeds to step S17.

In step S17, in one embodiment, the portable package 12 continuously transmits position information until it is reset, e.g. by entering a code using the I/O port 28.

In step S18, as there is no alarm condition, a delay is imposed before returning to step S11. Thus, in the embodiment of FIG. 3, transmission of position data is periodic until an alarm condition arises.

In one variation of this embodiment, the monitoring device 30 is configured to generate an alarm signal if the portable package moves away from a monitoring device by more than a predetermined distance. This may be applied where a child is supposed to remain close to a parent, which is often the case. In this embodiment, the parent or guardian carries a tracking unit similar to the device 30, except portable, that sends a keep alive signal that the portable package 12 monitors, and, in one embodiment, even responds to. Loss of signal either way triggers the parent's local alarm as well as triggers frequent or continuous position reporting and tracking signals from the portable package.

In another embodiment, communications between the portable package 12 and the monitoring device 30 are encrypted to minimize risk of unauthorized parties from intercepting communications and locating the person or object with the portable package. In this embodiment, the portable package 12 includes an encryption encoder/decoder 38 and the monitoring device 30 includes an encryption encoder/decoder 40. Any appropriate encryption protocol can be used. In one embodiment, an authorized key or code must be entered into the I/O port 28 and this code or key is used for encryption and decryption.

Figure 4:
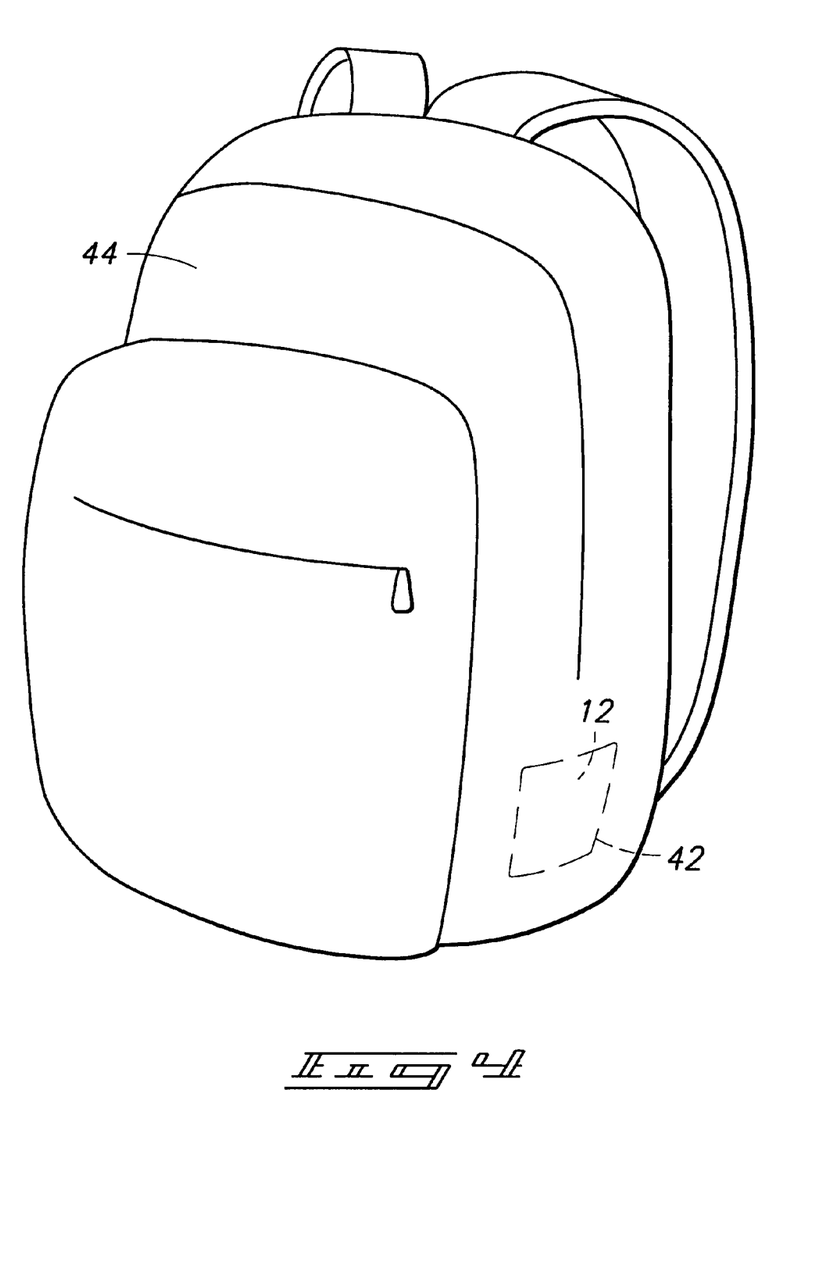
FIG. 4 is a perspective view illustrating packaging bearing a component of the system of FIG. 1.

The system 10 further includes a common housing 42 supporting the transmitter and the GPS receiver to define the portable package 12, as shown in FIG. 4. A non-limiting example could be a portable package 12 that is concealed or sewn into a clothing item to be borne by the child or individual to be tracked. For example, the clothing item could be a backpack 44 concealingly supporting the portable package in a manner such that the portable package is not visible by merely opening the backpack.

The protection sought is not to be limited to the disclosed embodiments, which are given by way of example only, but instead is to be limited only by the scope of the appended claims as properly interpreted in accordance with the doctrine of equivalents.

What is claimed is:

1. A method of determining and covertly communicating the location of a person, the method comprising:

providing a transponder, wherein the transponder is capable of communicating using any one of a plurality of possible non-switched networks;

providing a Global Positioning System (GPS) receiver configured to provide data representing position of the receiver in terms of latitude and longitude, and coupling the Global Positioning System (GPS) receiver to the transponder such that the data generated by the Global Positioning System (GPS) receiver can be transmitted by the transponder;

providing a common housing supporting the transponder and the Global Positioning System (GPS) receiver to define a portable package;

concealing the portable package in an object configured to be borne by the person; and transmitting coordinates, from the portable package, to a monitoring device remote from the portable package, the transponder of the portable package being configured to transmit communications to the monitoring device via a non-switched wireless network without need for human intervention in initiating a call from either the transponder or the monitoring device.

2. A method for determining and communicating the location of a person in accordance with claim 1 wherein the transmitting comprises using a paging feature of a Personal Communication Service (PCS) network.

3. A method for determining and communicating the location of a person in accordance with claim 1 wherein the transmitting comprises using a Personal Communication Service (PCS) network.

4. A method for determining and communicating the location of a person in accordance with claim 1 wherein the transmitting comprises using an a Multichannel Multipoint Distribution Service (MMDS) network.

5. A method for determining and communicating the location of a person in accordance with claim 1 wherein the transmitting comprises using an Automatic Position Reporting System (ARPS) network.

6. A method for determining and communicating the location of a person in accordance with claim 1, the method further comprising selecting, using the transponder, a network for communication based on signal availability.

7. A method for determining and communicating the location of a person in accordance with claim 1, the method further comprising selecting, using the transponder, a network for communication based on signal strength.

8. A method for determining and communicating the location of a person in accordance with claim 1 and further comprising providing an alarm signal, if the portable package has been moved more than a predetermined distance from predefined acceptable coordinates, by calculating a spatial movement of the portable package which exceeds the predetermined distance based on information supplied by the Global Positioning System (GPS) receiver, the alarm signal initiating a communication transmission to the monitoring device indicating that an alarm condition exists.

9. A method for determining and communicating the location of a person in accordance with claim 1 and further comprising providing an alarm signal, if the portable package moves at a speed greater than a predetermined speed, the speed being determined based on information supplied by the Global Positioning System (GPS) receiver, the alarm signal initiating a communication transmission to the monitoring device indicating that an alarm condition exists.

10. A method for determining and communicating the location of a person in accordance with claim 1 and further comprising storing the time and the position of the portable package, as determined by the Global Positioning System (GPS) receiver, at a plurality of time intervals.

11. A method for determining and communicating the location of a person in accordance with claim 1 and further comprising sewing the portable package into material of a clothing item configured to be borne by the person.

12. A system for communicating the location of an object, the system comprising:
a transmitter, the transmitter being capable of communicating using any one of a plurality of possible non-switched communications networks;
a Global Positioning System (GPS) receiver coupled to the transmitter, the Global Positioning System (GPS) receiver being configured to providing data representing position of the Global Positioning System (GPS) receiver, such that the data generated by the Global Positioning System (GPS) receiver can be transmitted by the transmitter;
a common housing supporting the transmitter and the Global Positioning System (GPS) receiver to define a portable package; and
a monitoring device remote from the portable package, the transmitter being configured to transmit communications to the monitoring device via a non-switched wireless network without need for human intervention in initiating a call from either the transponder or the monitoring device.

13. A system for communicating the location of an object in accordance with claim 12 wherein the transmitter is configured to selectively transmit using a Personal Communication Service (PCS) network.

14. A system for communicating the location of an object in accordance with claim 12 wherein the transmitter is configured to selectively transmit using a paging feature of a Personal Communication Service (PCS) network.

15. A system for communicating the location of an object in accordance with claim 12 wherein the transmitter is configured to selectively transmit using a Multichannel Multipoint Distribution Service (MMDS) network.

16. A system for communicating the location of an object in accordance with claim 12 wherein the transmitter is configured to selectively transmit using an Automatic Position Reporting System (ARPS) network.

17. A system for communicating the location of an object in accordance with claim 12 wherein the transmitter is configured to select a communications network based on signal availability.

18. A system for communicating the location of an object in accordance with claim 12 wherein the transmitter is configured to select a communications network based on signal strength.

19. A system for communicating the location of an object in accordance with claim 12 wherein the portable package includes a processor coupled to the Global Positioning System (GPS) receiver and to the transmitter and configured to provide an alarm signal if the portable package has been moved more than a predetermined distance from a predefined acceptable position, by comparing position of the portable package, based on information supplied by the Global Positioning System (GPS) receiver, with the position of the predefined acceptable position, the alarm signal causing the transmitter to transmit a communication to the monitoring device indicating that an alarm condition exists.

20. A system for communicating the location of an object in accordance with claim 12 wherein the portable package includes a processor coupled to the Global Positioning System (GPS) receiver and to the transmitter and configured to provide an alarm signal if the portable moves at a speed greater than a predetermined speed, the speed being determined based on information supplied by the Global Positioning System (GPS) receiver, the alarm signal causing the transmitter to transmit a communication to the monitoring device indicting that an alarm condition exists.

21. A system for communicating the location of an object in accordance with claim 20 and further comprising a memory coupled to the processor, the processor being configured to store the time and the position of the portable package, as determined by the Global Positioning System (GPS) receiver, at a plurality of time intervals.

22. A system for communicating the location of an object in accordance with claim 12 wherein the transmitter is configured to transmit to the monitoring device on a periodic basis.

23. A system for communicating the location of an object in accordance with claim 12 wherein the monitoring unit is configured to generate an alarm signal if the portable package moves away from the monitoring unit by more than a predetermined distance.

24. A system for communicating the location of an object in accordance with claim 12 and further comprising a backpack concealingly supporting the portable package in a manner such that the portable package is not visible by merely opening the backpack.

25. A system for determining and covertly communicating the location of a person, the system comprising:
a transmitter, the transmitter being configured to periodically transmit the data representing position to a monitoring situation via any one of a plurality of possible non-switched communications networks including, at least a paging service of a Personal Communication Service (PCS) network;
a Global Positioning System (GPS) receiver coupled to the transmitter, the Global Positioning System (GPS) receiver being configured to provide data representing position of the Global Positioning System (GPS) receiver, such that the data generated by the Global Positioning System (GPS) receiver can be transmitted by the transmitter; and
a common housing supporting the transmitter and the Global Positioning System (GPS) receiver to define a portable package configured to be borne by the person.

26. A system for communicating the location of an object in accordance with claim 25 wherein the portable package includes a processor coupled to the Global Positioning System (GPS) receiver and to the transmitter and configured to provide an alarm signal if the portable package has been moved more than a predetermined distance from a predefined acceptable position, by comparing position of the portable package, based on information supplied by the Global Positioning System (GPS) receiver, with the position of the predefined acceptable position, the alarm signal causing the transmitter to transmit a communication to the monitoring station, different from the periodic transmission, indicating that an alarm condition exists.

27. A system for communicating the location of an object in accordance with claim 25 wherein the portable package includes a processor coupled to the Global Positioning System (GPS) receiver and to the transmitter and configured to provide an alarm signal if the portable moves at a speed greater than a predetermine speed, the speed being determined based on information supplied by the Global Positioning System (GPS) receiver, the alarm signal causing the transmitter to transmit a communication to the monitoring station, different from the periodic transmission, indicating that an alarm condition exists.

28. A method of determining and communicating a location comprising:

receiving coordinate position information from a Global Positioning System (GPS) receiver;

determining a spatial location based on the coordinated position information from a Global Positioning System (GPS) receiver;

selecting a non-switched network with which to communicate from a plurality of possible non-switched networks;

transmitting the spatial location to the selected non-switched network.

29. The method recited above with respect to claim 28, wherein the non-switched network is a first non-switched network, the method further comprises:

selecting a second non-switched network with which to communicate from the plurality of possible non-switched networks;

transmitting the spatial location to the second selected non-switched network.

30. The method recited above with respect to claim 28 further comprises:

calculating a distance, wherein the distance is the difference between predefined coordinate position information and the coordinate position information from the Global Positioning System (GPS) receiver;

determining if the distance exceeds a predetermined distance; and initiating a communication transmission, wherein the communication transmission indicates that the predetermined distance has been exceeded.

* * * * *